(12) United States Patent
Zhang (10) Patent No.: US 11,908,331 B2
(45) Date of Patent: Feb. 20, 2024

(54) SYSTEMS AND METHODS FOR CONCURRENT MANAGEMENT OF MULTIPLE UNMANNED AIRCRAFT

(71) Applicant: WING AVIATION LLC, Mountain View, CA (US)

(72) Inventor: Fan Zhang, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 342 days.

(21) Appl. No.: 17/356,240

(22) Filed: Jun. 23, 2021

(65) Prior Publication Data
US 2022/0415188 A1   Dec. 29, 2022

(51) Int. Cl.
| | | |
|---|---|---|
| G08G 5/00 | (2006.01) | |
| G05D 1/10 | (2006.01) | |
| G06F 3/04817 | (2022.01) | |
| G06F 3/0482 | (2013.01) | |

(52) U.S. Cl.
CPC ........... *G08G 5/0026* (2013.01); *G05D 1/104* (2013.01); *G06F 3/04817* (2013.01); *G08G 5/0039* (2013.01); *G06F 3/0482* (2013.01)

(58) Field of Classification Search
CPC .................................................. G08G 5/0026
See application file for complete search history.

(56) References Cited

U.S. PATENT DOCUMENTS

| | | | |
|---|---|---|---|
| 9,841,761 B2 | 12/2017 | Shehata et al. | |
| 2003/0210426 A1* | 11/2003 | Kai ..................... | G06K 15/005 |
| | | | 358/1.15 |
| 2011/0193788 A1* | 8/2011 | King ..................... | G06F 16/168 |
| | | | 345/173 |
| 2015/0142211 A1* | 5/2015 | Shehata ............... | G08G 5/0069 |
| | | | 701/2 |

FOREIGN PATENT DOCUMENTS

| | | | |
|---|---|---|---|
| JP | 2018522306 A | | 8/2018 |
| KR | 20170109759 A | * | 10/2017 |
| KR | 20170109759 A | | 10/2017 |

OTHER PUBLICATIONS

International Search Report and Written Opinion, dated Sep. 8, 2022, in corresponding International Patent Application No. PCT/US2022/030940, 22 pages.

* cited by examiner

*Primary Examiner* — Roland J Casillas
(74) *Attorney, Agent, or Firm* — Christensen O'Connor Johnson Kindness PLLC (57) ABSTRACT

In some embodiments, a computer-implemented method of managing a fleet of unmanned aerial vehicles (UAVs) is provided. A fleet management computing system receives telemetry information from a plurality of UAVs. The fleet management computing system generates a map interface having a plurality of UAV icons based on the telemetry information. The fleet management computing system receives a selection of an initial group of UAV icons via the map interface, wherein the initial group of UAV icons includes two or more UAV icons. The fleet management computing system receives a de-selection of one or more UAV icons from the initial group of UAV icons to create a final selected group of UAV icons. The fleet management computing system transmits a command to UAVs associated with the UAV icons of the final selected group of UAV icons.

16 Claims, 11 Drawing Sheets

SYSTEMS AND METHODS FOR CONCURRENT MANAGEMENT OF MULTIPLE UNMANNED AIRCRAFT

TECHNICAL FIELD

This disclosure relates generally to unmanned aerial vehicles (UAVs), and in particular but not exclusively, relates to concurrent management of multiple UAVs.

BACKGROUND

Fleets of multiple unmanned aerial vehicles, or UAVs, are being increasingly employed for many purposes, including but not limited to data collection and delivery of packages. While UAVs may be capable of fully autonomous operation to traverse paths or accomplish other types of missions, oversight of operation of even fully autonomous UAVs is often provided by a human operator. The human operator may monitor information sources that are not considered by sensors of the UAVs, including but not limited to weather reports and emergency incident reports, and may transmit commands to a UAV to deviate from a planned mission based on that information.

As fleets of UAVs grow larger, each human operator may be responsible for oversight of a number of UAVs that is unmanageable using current technologies that only allow transmission of commands to a single UAV at a time. What is desired are technologies that allow a human operator to manage multiple UAVs at once while remaining flexible enough to allow the human operator to transmit commands to fewer than all UAVs for which they are responsible.

BRIEF SUMMARY

In some embodiments, a computer-readable medium having logic stored thereon is provided. The logic, in response to execution by one or more processors of a fleet management computing system, causes the fleet management computing system to perform actions for managing a fleet of unmanned aerial vehicles (UAVs), the actions including receiving, by the fleet management computing system, telemetry information from a plurality of UAVs; generating, by the fleet management computing system, a map interface having a plurality of UAV icons based on the telemetry information; receiving, by the fleet management computing system, a selection of an initial group of UAV icons via the map interface, where the initial group of UAV icons includes two or more UAV icons; receiving, by the fleet management computing system, a de-selection of one or more UAV icons from the initial group of UAV icons to create a final selected group of UAV icons; and transmitting, by the fleet management computing system, a command to UAVs associated with the UAV icons of the final selected group of UAV icons.

In some embodiments, a computer-implemented method of managing a fleet of unmanned aerial vehicles (UAVs) is provided. A fleet management computing system receives telemetry information from a plurality of UAVs. The fleet management computing system generates a map interface having a plurality of UAV icons based on the telemetry information. The fleet management computing system receives a selection of an initial group of UAV icons via the map interface, wherein the initial group of UAV icons includes two or more UAV icons. The fleet management computing system receives a de-selection of one or more UAV icons from the initial group of UAV icons to create a final selected group of UAV icons. The fleet management computing system transmits a command to UAVs associated with the UAV icons of the final selected group of UAV icons.

In some embodiments, a system that includes a plurality of unmanned aerial vehicles (UAVs) and a fleet management computing system is provided. The fleet management computing system is communicatively coupled to the plurality of UAVs and includes a non-transitory computer-readable medium having logic stored thereon. The logic, in response to execution by one or more processors of the fleet management computing system, causes the fleet management computing system to perform actions including receiving, by the fleet management computing system, telemetry information from the plurality of UAVs, generating, by the fleet management computing system, a map interface having a plurality of UAV icons based on the telemetry information, receiving, by the fleet management computing system, a selection of an initial group of UAV icons via the map interface, where the initial group of UAV icons includes two or more UAV icons, receiving, by the fleet management computing system, a de-selection of one or more UAV icons from the initial group of UAV icons to create a final selected group of UAV icons, transmitting, by the fleet management computing system, a command to UAVs associated with the UAV icons of the final selected group of UAV icons.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

In embodiments of the present disclosure, a fleet management computing system provides a map-based user interface that can be used by an operator to flexibly select UAVs to which commands are transmitted. In the map interface generated by the fleet management computing system, an operator may select UAVs in groups, and may then remove individual UAVs from the selection to precisely tailor the UAVs to receive the command. In some embodiments, the fleet management computing system also monitors acknowledgements from the UAVs, and automatically updates the map interface to indicate UAVs to receive a retried transmission of the command.

Figure 1:
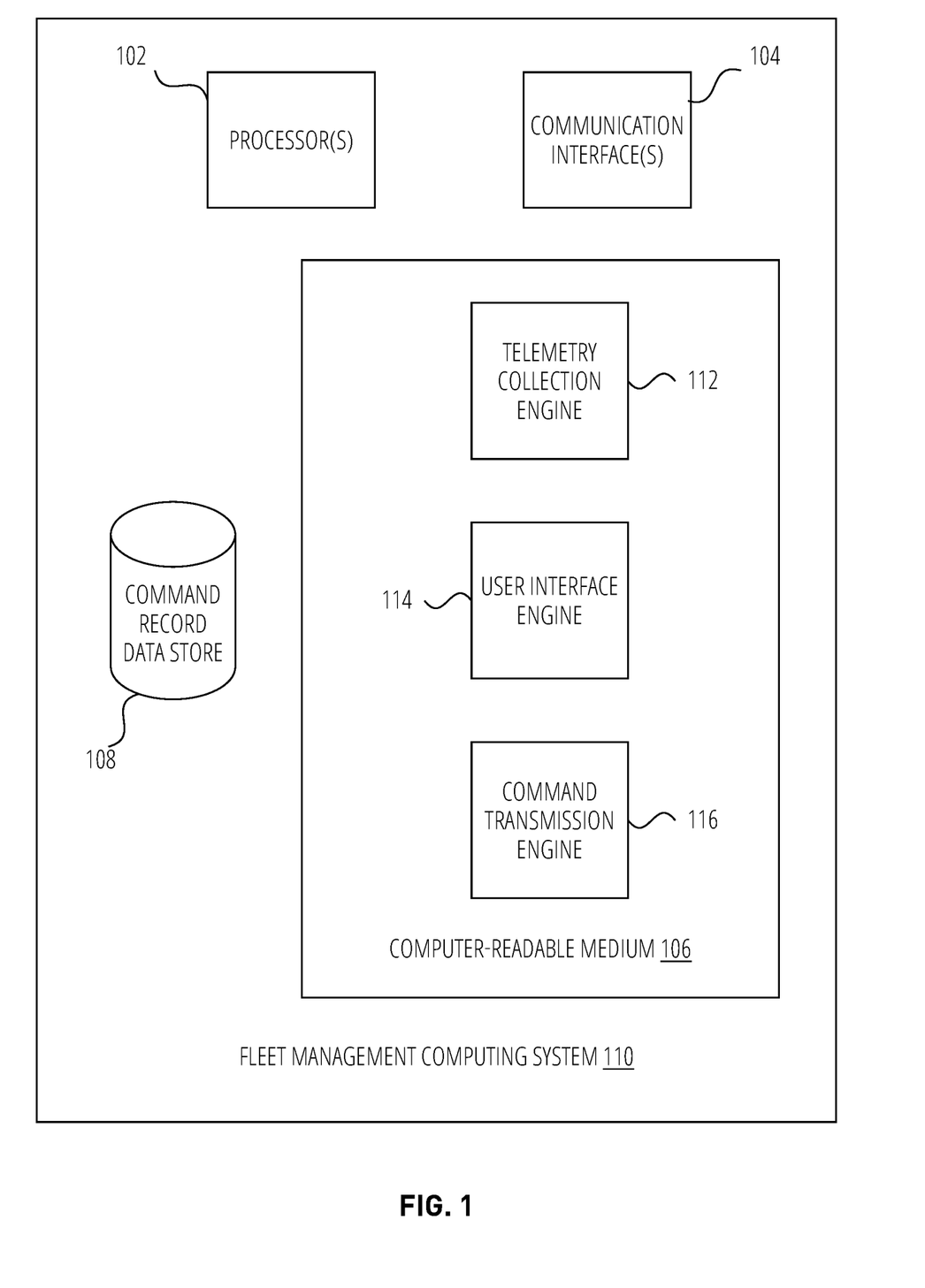
FIG. 1 is a block diagram that illustrates aspects of a non-limiting example embodiment of a fleet management computing system according to various aspects of the present disclosure.

FIG. 1 is a block diagram that illustrates aspects of a non-limiting example embodiment of a fleet management computing system according to various aspects of the present disclosure. The illustrated fleet management computing system 110 may be implemented by any computing device or collection of computing devices, including but not limited to a desktop computing device, a laptop computing device, a mobile computing device, a server computing device, a computing device of a cloud computing system, and/or combinations thereof. In general, the fleet management computing system 110 is configured to receive telemetry information from a plurality of UAVs, and to generate a map interface that allows a user to select groups of UAVs to which commands are sent.

As shown, the fleet management computing system 110 includes one or more processors 102, one or more communication interfaces 104, a command record data store 108, and a computer-readable medium 106.

In some embodiments, the processors 102 may include any suitable type of general-purpose computer processor. In some embodiments, the processors 102 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 104 include one or more hardware and or software interfaces suitable for providing communication links between the fleet management computing system 110 and the plurality of UAVs. The communication interfaces 104 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 106 has stored thereon logic that, in response to execution by the one or more processors 102, cause the fleet management computing system 110 to provide a telemetry collection engine 112, a user interface engine 114, and a command transmission engine 116.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the telemetry collection engine 112 is configured to receive telemetry information from the plurality of UAVs while the plurality of UAVs are in flight, and to provide the telemetry information to the user interface engine 114. In some embodiments, the user interface engine 114 is configured to use the telemetry information, mission specifications, airspace reservations, and/or other information to generate a map interface from which UAVs may be selected by a user. In some embodiments, the command transmission engine 116 is configured to transmit a command to UAVs selected within the map interface. The command transmission engine 116 may also be configured to receive acknowledgements of transmitted commands from the UAVs, to compare the acknowledgements to records of the transmitted commands stored in the command record data store 108, and to provide the user interface engine 114 with information to allow the user interface engine 114 to generate an interface through which failed commands may be retried. Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, TypeScript, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 2A:
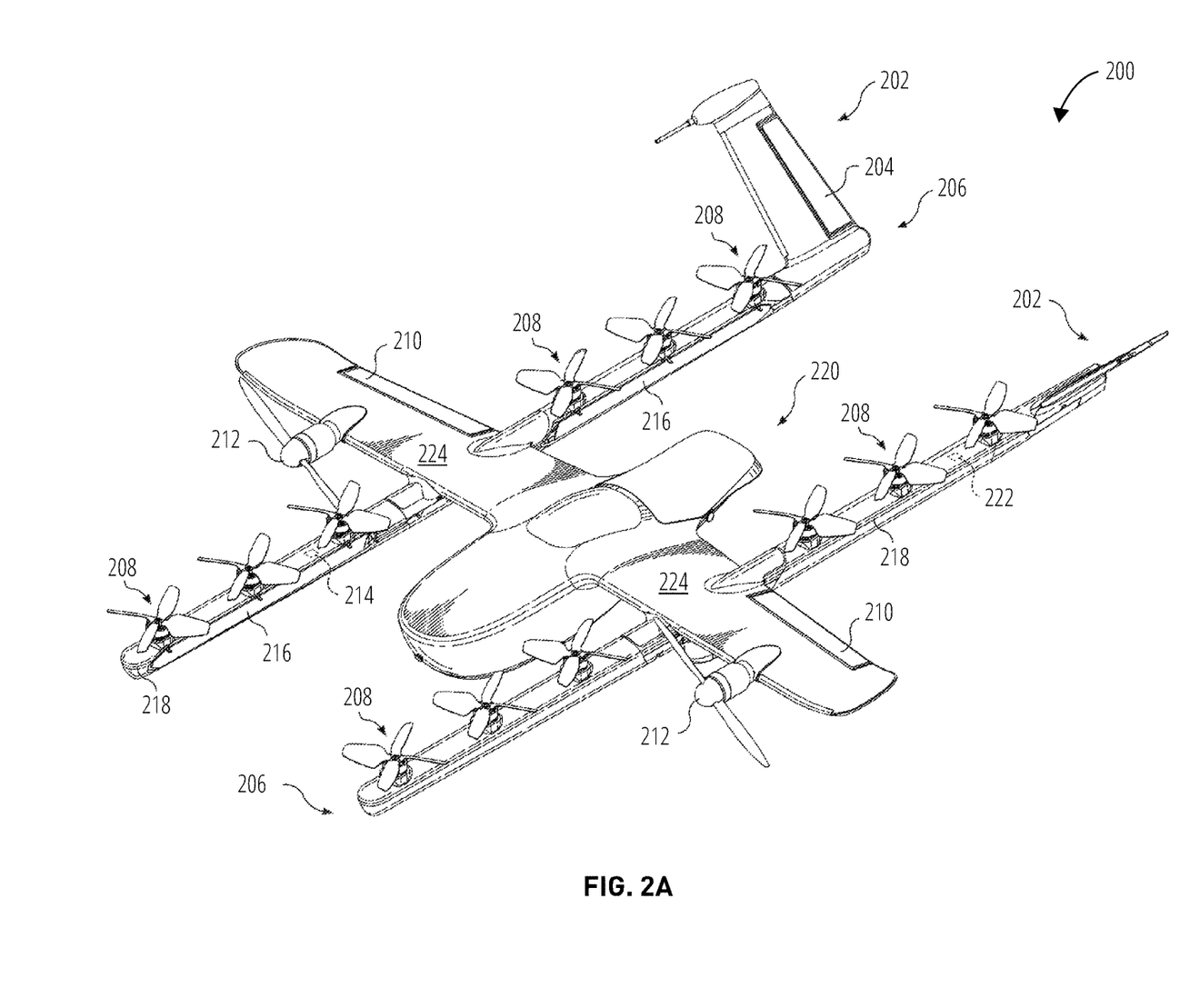
FIG. 2A and FIG. 2B illustrate a non-limiting example embodiment of a UAV according to various aspects of the present disclosure.
Figure 2B:
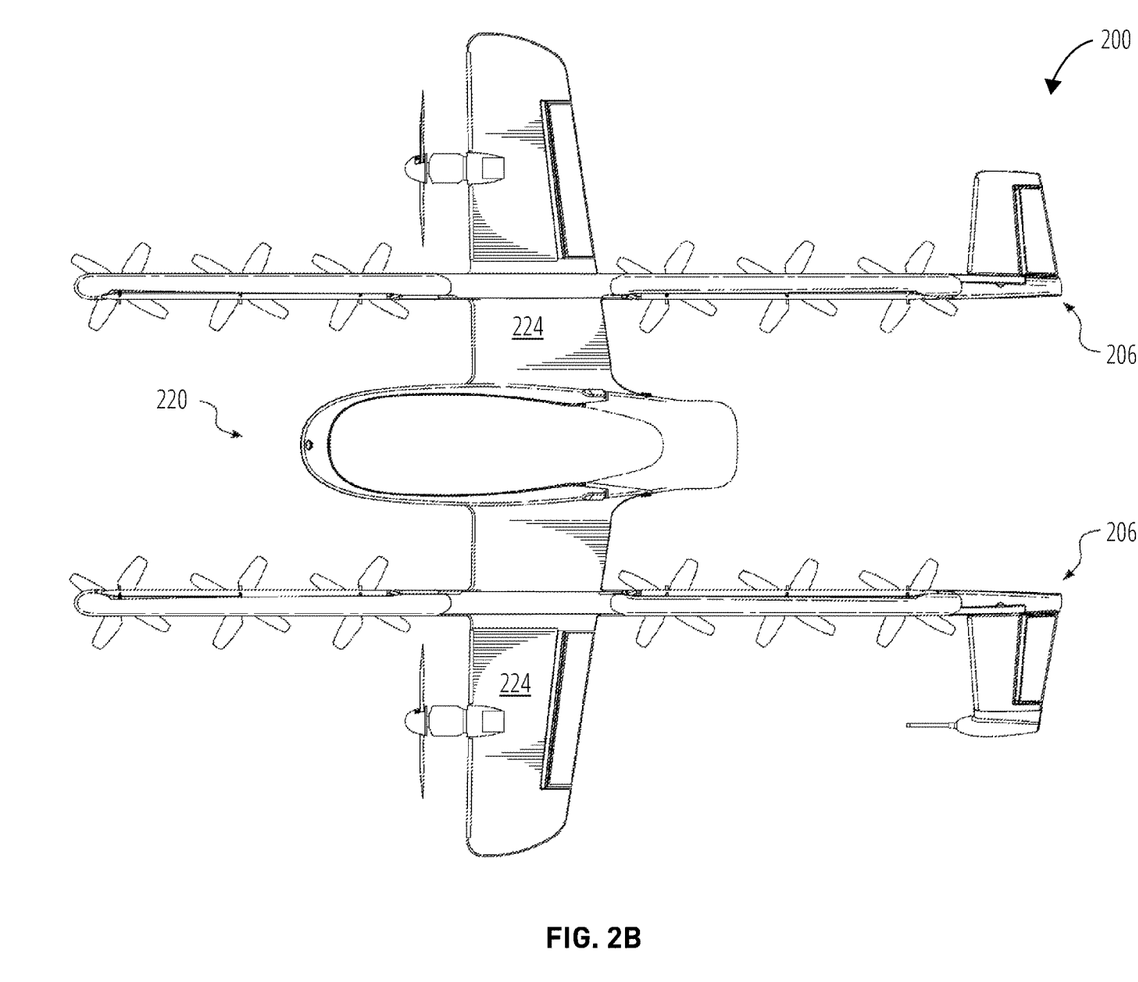

FIG. 2A and FIG. 2B illustrate an aerial vehicle or UAV 200, in accordance with an embodiment of the present disclosure. The illustrated embodiment of UAV 200 is a vertical takeoff and landing (VTOL) unmanned aerial vehicle (UAV) that includes separate propulsion units 212 and propulsion units 208 for providing horizontal and vertical propulsion, respectively. UAV 200 is a fixed-wing aerial vehicle, which as the name implies, has a wing assembly 224 that can generate lift based on the wing shape and the vehicle's forward airspeed when propelled horizontally by propulsion units 212. FIG. 2A is a perspective top view illustration of UAV 200 while FIG. 2B is a bottom side plan view illustration of UAV 200. One of ordinary skill in the art will recognize that UAV 200 is a non-limiting example of a UAV that may be used with embodiments of the present disclosure, and that in some embodiments, a fleet of UAVs managed by the fleet management computing system may include other types of UAVs in addition to or instead of the UAV 200 illustrated in FIG. 2A, FIG. 2B, and FIG. 3.

The illustrated embodiment of UAV 200 includes a fuselage 220. In one embodiment, fuselage 220 is modular and includes a battery module, an avionics module, and a mission payload module. These modules are detachable from each other and mechanically securable to each other to contiguously form at least a portion of the fuselage 220 or UAV main body.

Figure 3:
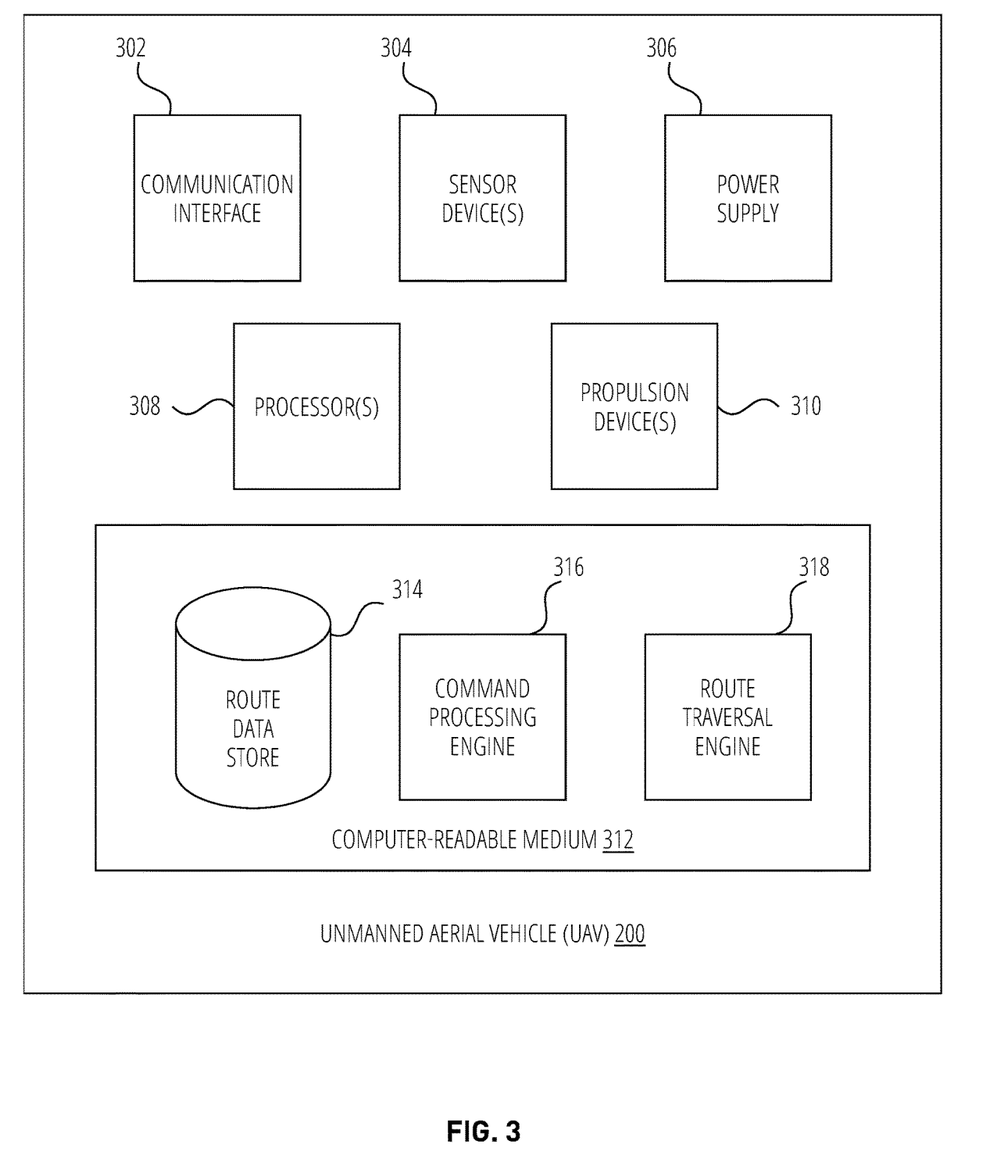
FIG. 3 is a block diagram that illustrates further aspects of a non-limiting example embodiment of a UAV according to various aspects of the present disclosure.

The battery module includes a cavity for housing one or more batteries for powering UAV 200. The avionics module houses flight control circuitry of UAV 200, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 200. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Other components that may be carried by some embodiments of the UAV 200 are illustrated in FIG. 3.

The illustrated embodiment of UAV 200 further includes horizontal propulsion units 212 positioned on wing assembly 224, which can each include a motor, shaft, motor mount, and propeller, for propelling UAV 200. The illustrated embodiment of UAV 200 includes two boom assemblies 206 that secure to wing assembly 224.

The illustrated embodiments of boom assemblies 206 each include a boom housing 218 in which a boom is disposed, vertical propulsion units 208, printed circuit boards 216, and stabilizers 202. Vertical propulsion units 208 can each include a motor, shaft, motor mounts, and propeller, for providing vertical propulsion. Vertical propulsion units 208 may be used during a hover mode where UAV 200 is descending (e.g., to a delivery location) or ascending (e.g., following a delivery). Stabilizers 202 (or fins) may be included with UAV 200 to stabilize the UAV's yaw (left or right turns) during flight. In some embodiments, UAV 200 may be configured to function as a glider. To do so, UAV 200 may power off its propulsion units and glide for a period of time.

During flight, UAV 200 may control the direction and/or speed of its movement by controlling its pitch, roll, yaw, and/or altitude. For example, the stabilizers 202 may include one or more rudders 204 for controlling the UAV's yaw, and wing assembly 224 may include elevators for controlling the UAV's pitch and/or ailerons 210 for controlling the UAV's roll. As another example, increasing or decreasing the speed of all the propellers simultaneously can result in UAV 200 increasing or decreasing its altitude, respectively. The UAV 200 may also include components for sensing the environment around the UAV 200, including but not limited to audio sensor 222 and audio sensor 214. Further examples of sensor devices are illustrated in FIG. 3 and described below.

Many variations on the illustrated fixed-wing aerial vehicle are possible. For instance, aerial vehicles with more wings (e.g., an "x-wing" configuration with four wings), are also possible. Although FIG. 2A and FIG. 2B illustrate one wing assembly 224, two boom assemblies 206, two horizontal propulsion units 212, and six vertical propulsion units 208 per boom assembly 206, it should be appreciated that other variants of UAV 200 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 3 is a block diagram that illustrates additional aspects of a UAV according to various aspects of the present disclosure. As shown, the UAV 200 includes a communication interface 302, one or more sensor device(s) 304, a power supply 306, one or more processor(s) 308, one or more propulsion device(s) 310, and a computer-readable medium 312.

In some embodiments, the communication interface 302 includes hardware and software to enable any suitable communication technology for communicating with the fleet management computing system 110. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate with the fleet management computing system 110 while traversing a route. The communication interface 302 may also include a medium-range wireless interface such as a Wi-Fi interface to be used when the UAV 200 is at an area near a start location or an endpoint where Wi-Fi coverage is available. The communication interface 302 may also include a short-range wireless interface such as a Bluetooth interface to be used when the UAV 200 is in a maintenance location or is otherwise stationary and waiting to be assigned a route. The communication interface 302 may also include a wired interface, such as an Ethernet interface or a USB interface, which may also be used when the UAV 200 is in a maintenance location or is otherwise stationary and waiting to be assigned a route.

In some embodiments, the sensor device(s) 304 are configured to detect states related to various components of the UAV 200, and to transmit signals representing those states to other components of the UAV 200. Some non-limiting examples of sensor device(s) 304 that may monitor components of the UAV 200 itself include a battery state sensor and a propulsion device health sensor. Some non-limiting examples of sensor device(s) 304 that may monitor the UAV 200 with respect to the environment include a positioning system sensor (including but not limited to a GPS sensor), an attitude sensor, an airspeed sensor, a compass, and an altitude sensor.

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion device(s) 310 may include any suitable devices for causing the UAV 200 to travel along a route, and may include devices such as, but not limited to, one or more motors, one or more propellers, and one or more flight control surfaces.

In some embodiments, the processor(s) 308 may include any type of computer processor capable of receiving signals from other components of the UAV 200 and executing instructions stored on the computer-readable medium 312. In some embodiments, the computer-readable medium 312 may include one or more devices capable of storing information for access by the processor(s) 308. In some embodiments, the computer-readable medium 312 may include one or more of a hard drive, a flash drive, an EEPROM, and combinations thereof.

As shown, the computer-readable medium 312 has stored thereon a route data store 314, a command processing engine 316, and a route traversal engine 318. In some embodiments, the route traversal engine 318 is configured to cause the propulsion device(s) 310 to propel the UAV 200 through a route received from a human pilot, an automated system, or from any other device and stored in the route data store 314. The route traversal engine 318 may use signals from other devices, such as GPS sensor devices, vision-based navigation devices, accelerometers, LIDAR devices, and/or other devices, to assist in positioning and navigation as is typical for a UAV 200. In some embodiments, the command processing engine 316 is configured to receive commands from the fleet management computing system 110, to cause the route traversal engine 318 to implement the commands, and to transmit acknowledgement notifications to the fleet management computing system 110 upon successful receipt of the commands.

Figure 4A:
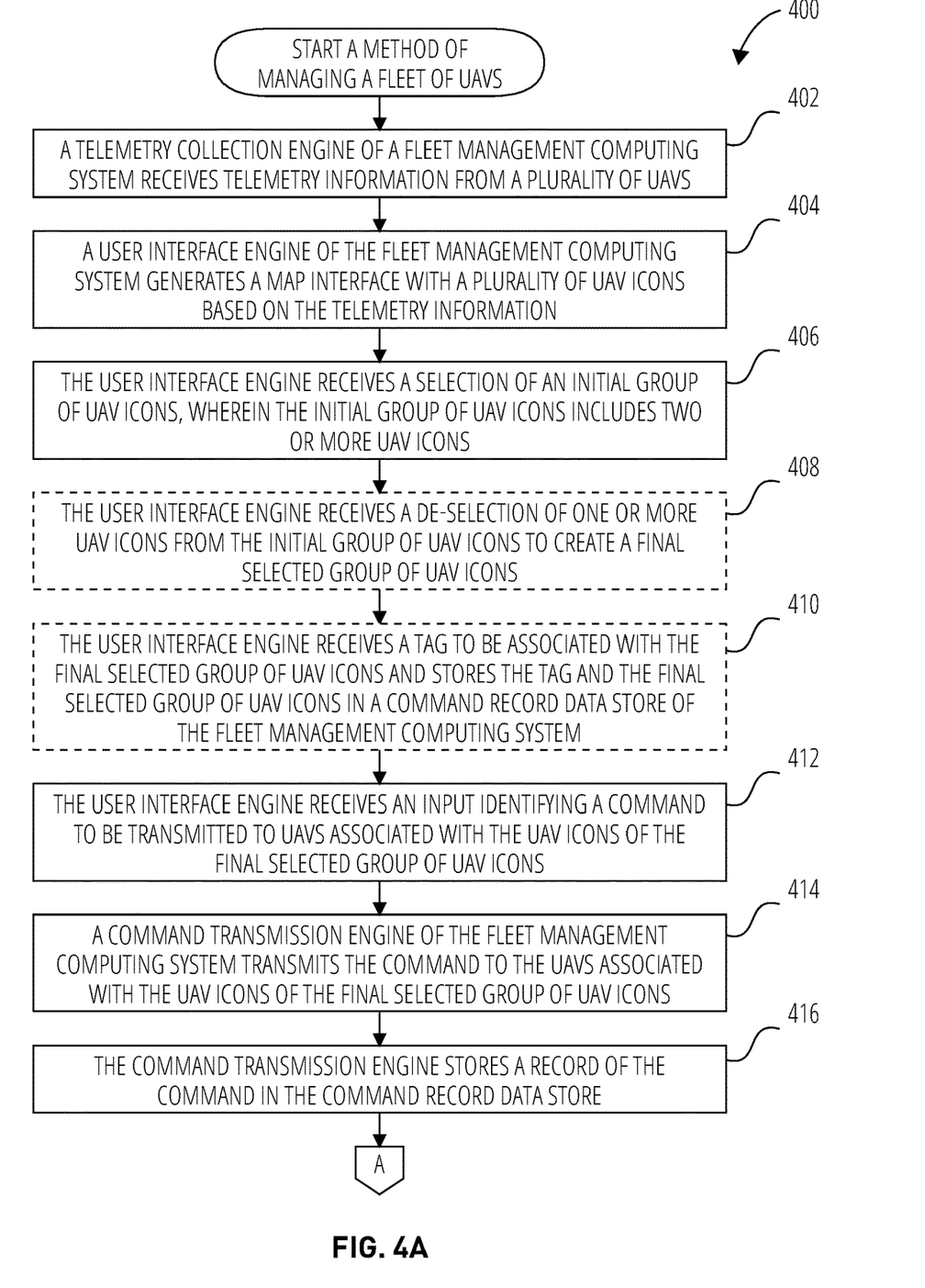
FIG. 4A-FIG. 4B are a flowchart that illustrates a non-limiting example embodiment of a method of managing a fleet of UAVs according to various aspects of the present disclosure.
Figure 4B:
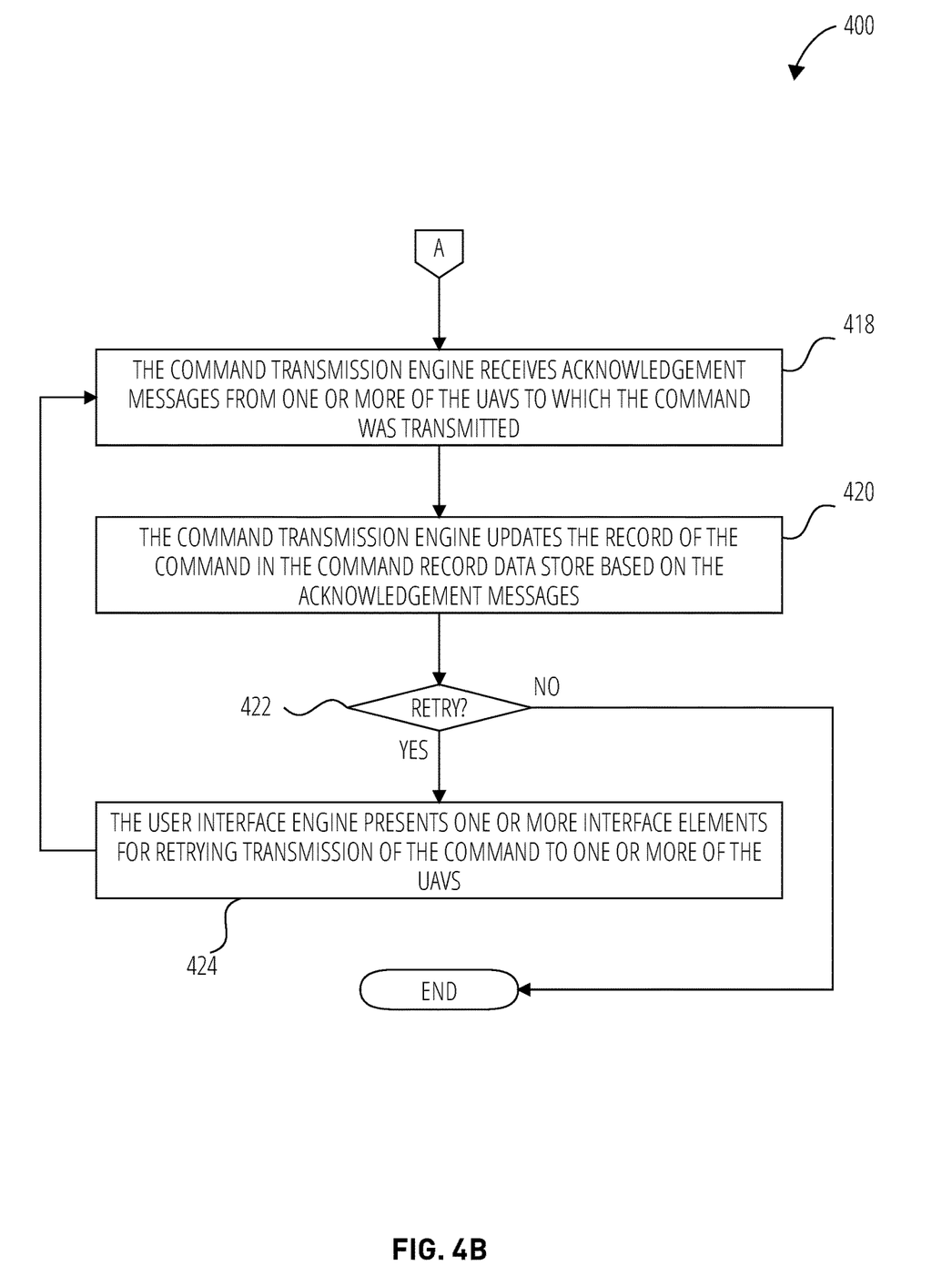

FIG. 4A-FIG. 4B are a flowchart that illustrates a non-limiting example embodiment of a method of managing a fleet of UAVs according to various aspects of the present disclosure. In the method 400, the fleet management computing system 110 generates a map interface that allows a user to select multiple UAVs based on a map area, and to transmit commands to the selected UAVs. Because group management tasks for a fleet of UAVs will often be applied to UAVs within a geographic area, using a map interface to select an initial group of UAVs and then to refine that selection to fewer than all of the initial group of UAVs (as described below) provides an intuitive interface that both allows an operator to quickly specify groups of UAVs based on geography and then to also conveniently revise that selection.

From a start block, the method 400 proceeds to block 402, where a telemetry collection engine 112 of a fleet management computing system 110 receives telemetry information from a plurality of UAVs. As discussed above, each UAV 200 includes one or more wireless communication interfaces 302 which are capable of communicating with one or more communication interfaces 104 on the fleet management computing system 110 while in flight. The telemetry collection engine 112 may receive any suitable telemetry information that allows the fleet management computing system 110 to generate the map interface, including but not limited to one or more of positioning information (including but not limited to one or more of a latitude/longitude, a set of GPS coordinates, a what3words geocode, or a Plus Code), altitude information, attitude information, and speed information.

At block 404, a user interface engine 114 of the fleet management computing system 110 generates a map interface with a plurality of UAV icons based on the telemetry information. The map interface may be generated by the user interface engine 114 using any suitable technique. In some embodiments, the user interface engine 114 may generate a web interface that is retrieved and rendered by a standard web browser on a user device. In some embodiments, the user interface engine 114 may provide information for an interface program to provide portions of the map interface (such as the plurality of UAV icons) as an overlay to a map provided by a system separate from the fleet management computing system 110. In some embodiments, the user interface engine 114 may generate the map interface as a video or graphic presentation, and may provide the video or graphic presentation as the map interface. Any other suitable technique for generating an interactive interface may be used. Because such techniques are known to those of skill in the art, they are not described here in any further detail for the sake of brevity.

Figure 5:
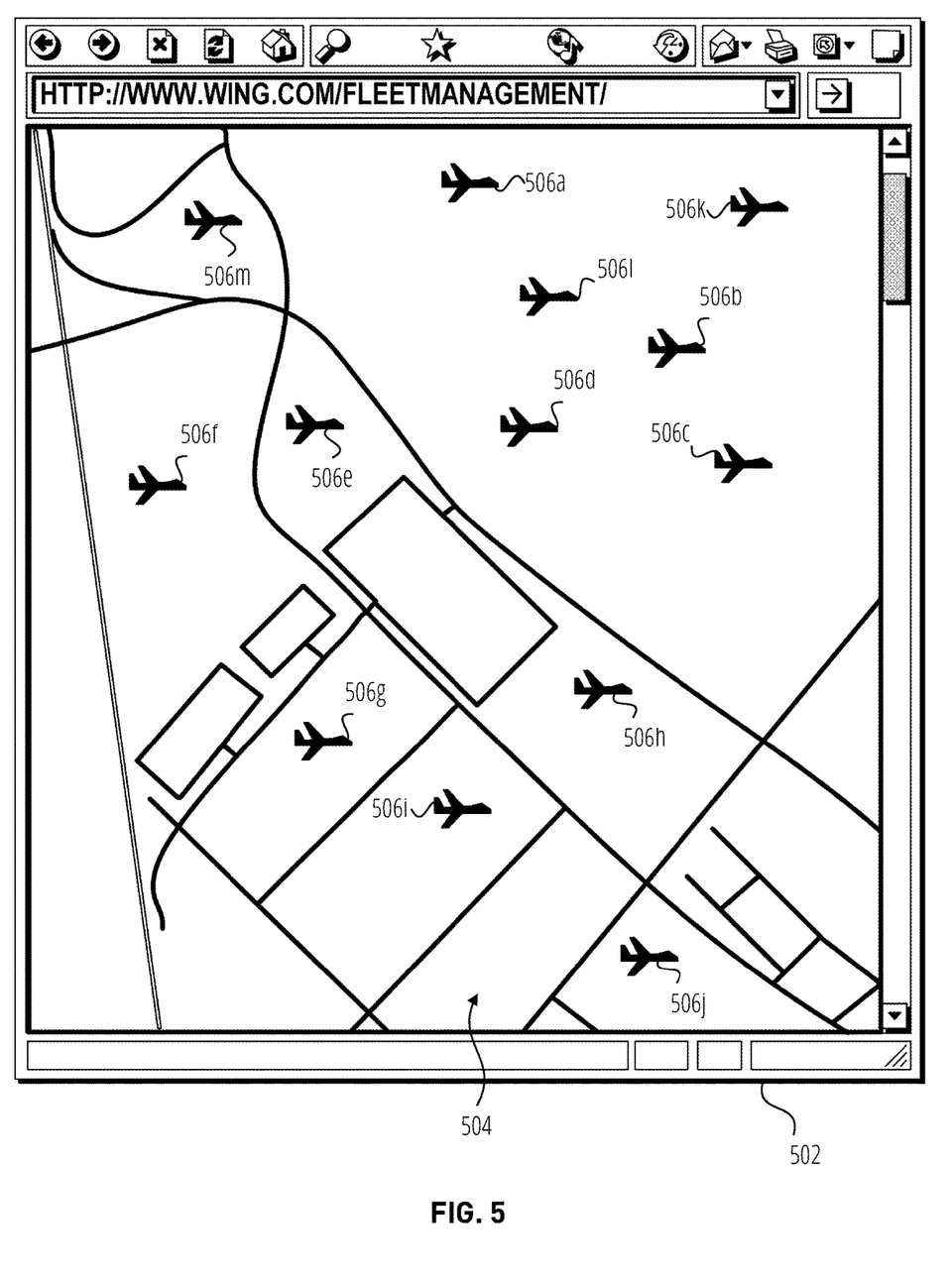
FIG. 5 is an illustration of a non-limiting example embodiment of a map interface generated by the user interface engine according to various aspects of the present disclosure.

FIG. 5 is an illustration of a non-limiting example embodiment of a map interface generated by the user interface engine 114 according to various aspects of the present disclosure. In the illustrated embodiment, the map interface 504 is presented within a standard web browser 502. As shown, the map interface 504 shows a map. The map interface 504 includes a plurality of UAV icons 506a-506m, which are presented at locations indicated by the telemetry information. Though all of the UAV icons 506a-506m match, in some embodiments, different UAV icons may be used for different types of UAVs. A user may scroll the map by clicking-and-dragging, using scroll arrows, or by any other suitable technique. As the area depicted by the map interface 504 moves, different UAV icons may be displayed. Likewise, as the telemetry collection engine 112 continues to receive telemetry information, the locations of the UAV icons 506a-506m may be updated within the map interface 504 by the user interface engine 114.

Figure 6A:
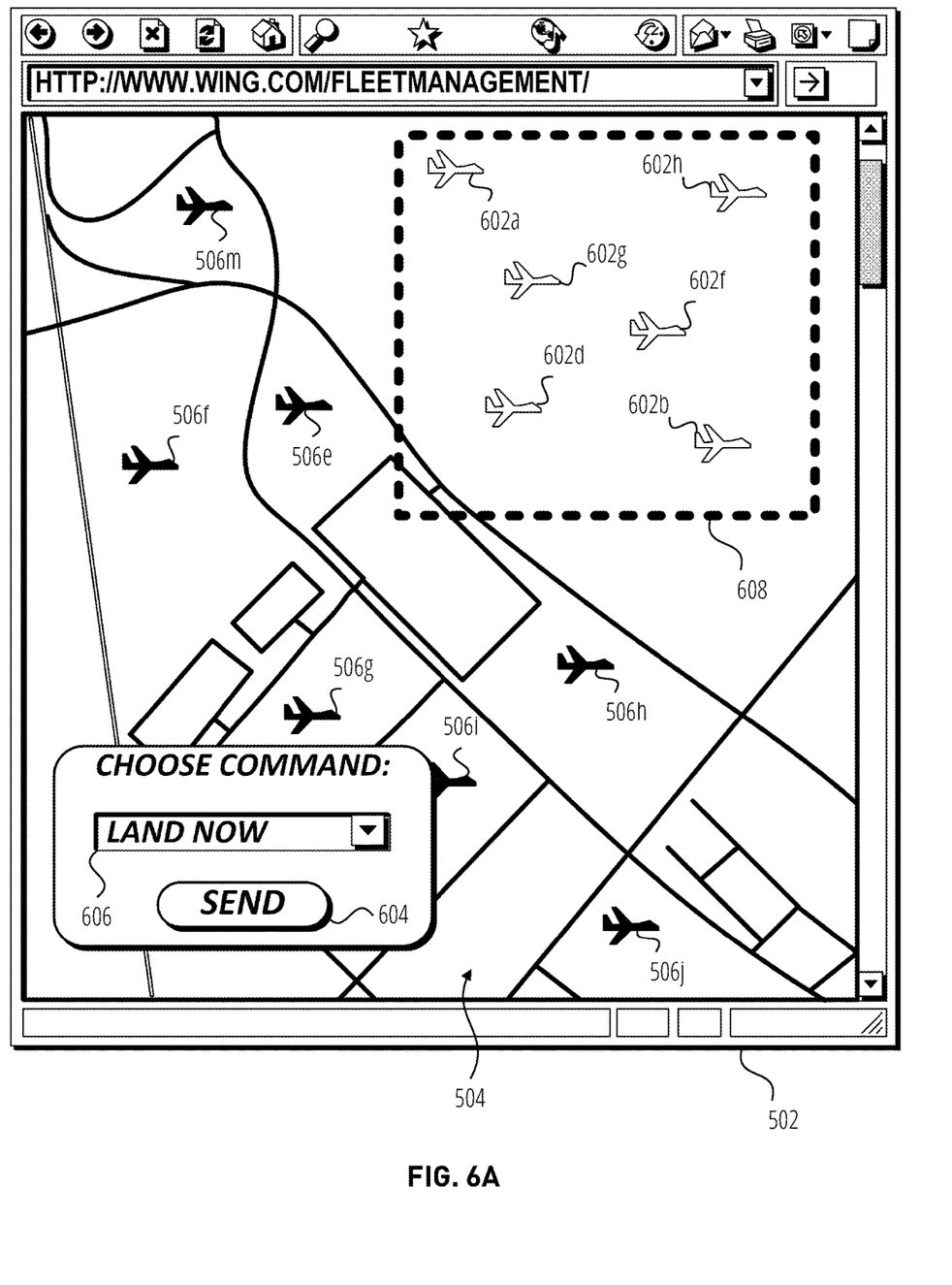
FIG. 6A and FIG. 6B illustrate two non-limiting example embodiments of techniques for providing a selection of an initial group of UAV icons via the map interface according to various aspects of the present disclosure.
Figure 6B:
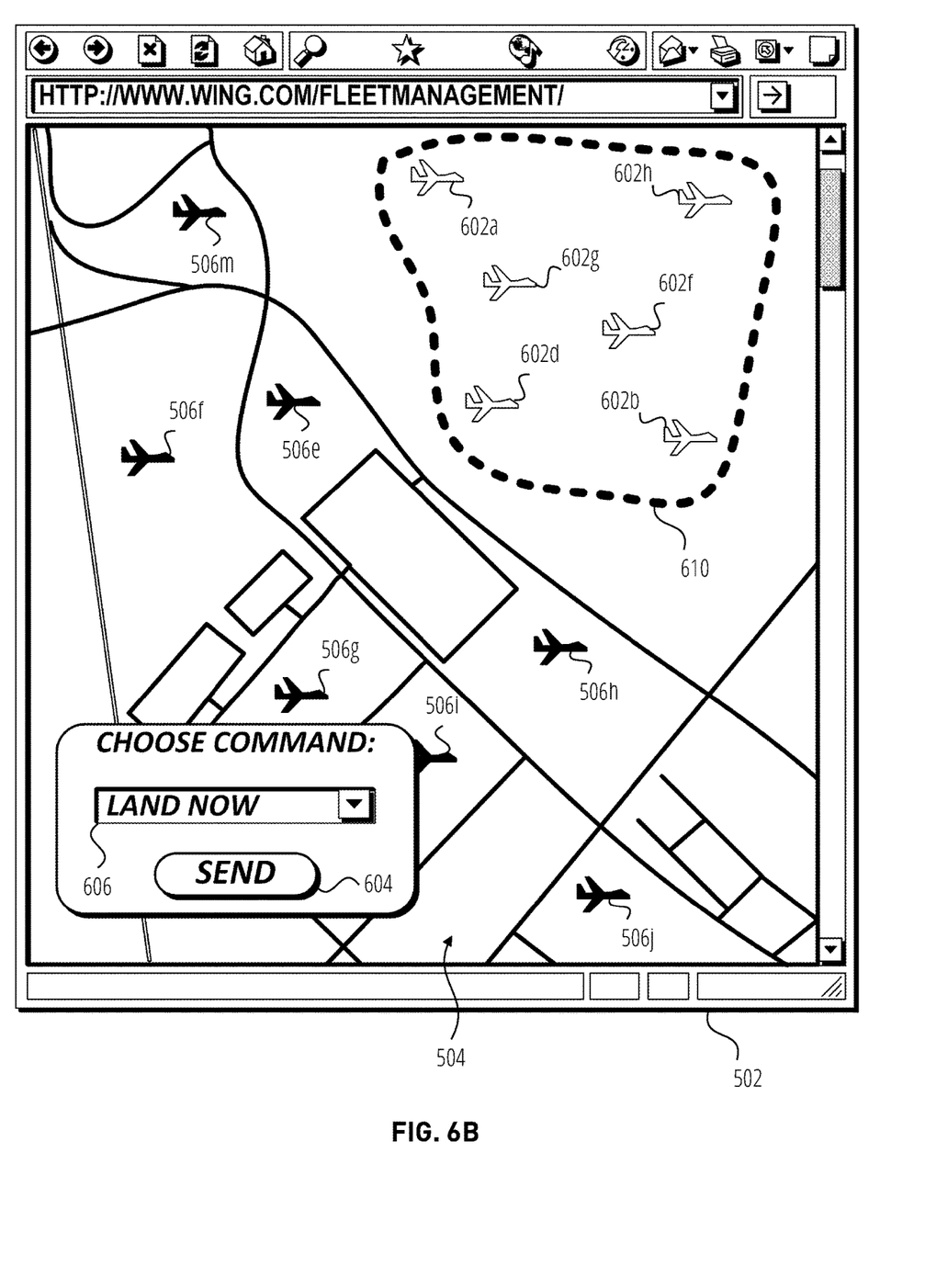

At block 406, the user interface engine 114 receives a selection of an initial group of UAV icons, wherein the initial group of UAV icons includes two or more UAV icons. FIG. 6A and FIG. 6B illustrate two non-limiting example embodiments of techniques for providing a selection of an initial group of UAV icons via the map interface 504 according to various aspects of the present disclosure.

In FIG. 6A, a rectangular selection border 608 is drawn around a group of UAV icons to create the initial group of UAV icons. As shown, UAV icons 506a, 506b, 506c, 506d, 506k, and 506l from FIG. 5 have changed to selected UAV icons 602a-602h to indicate that they are part of the selected group.

The map interface 504 may allow the user to draw the rectangular selection border 608 using any suitable technique. As one non-limiting example, the map interface 504 may allow the user to click in a first corner and then to drag a diagonal corner of the rectangular selection border 608 to stretch the border over the desired area. As another non-limiting example, the map interface 504 may allow the user to click in a first corner and then to click in another corner to define the rectangular selection border 608.

In FIG. 6B, instead of a rectangular selection border 608, a lasso selection border 610 is drawn around the same group of UAV icons to create the initial group of UAV icons. The lasso selection border 610 may be provided by the user drawing a border in any shape around the desired group of UAV icons. Both the rectangular selection border 608 and the lasso selection border 610 have various advantages. For example, the rectangular selection border 608 is easily represented and may be communicated easily to the fleet management computing system 110, but is less precise. Meanwhile, the lasso selection border 610 is more difficult to represent and may be complex to communicate to the fleet management computing system 110, but allows for a precise selection of a geographically contiguous group of UAV icons.

In some embodiments (particularly embodiments wherein clicking-and-dragging normally causes the map area to scroll), the map interface 504 may use a modifier key to accompany the click (e.g., a shift-click or an alt-click) to change a mode of the map interface 504 from a scroll mode to a border-defining mode. In some embodiments, the map interface 504 may provide a control (e.g., a button) that switches the mode from the scroll mode to the border-defining mode. FIG. 6A and FIG. 6B also show a send command interface element 604 and a choose command interface element 606, which will be discussed in further detail below.

Returning to FIG. 4A, at optional block 408, the user interface engine 114 receives a de-selection of one or more UAV icons from the initial group of UAV icons to create a final selected group of UAV icons. The de-selection of the UAV icons may be provided using any suitable technique. In some embodiments, a modified click (e.g., a control-click, a right-click, a long tap) may be used to indicate that a selected UAV icon should be de-selected. In some embodiments, a normal click or tap on a UAV icon may toggle the UAV icon between a selected state and a de-selected state.

Figure 7:
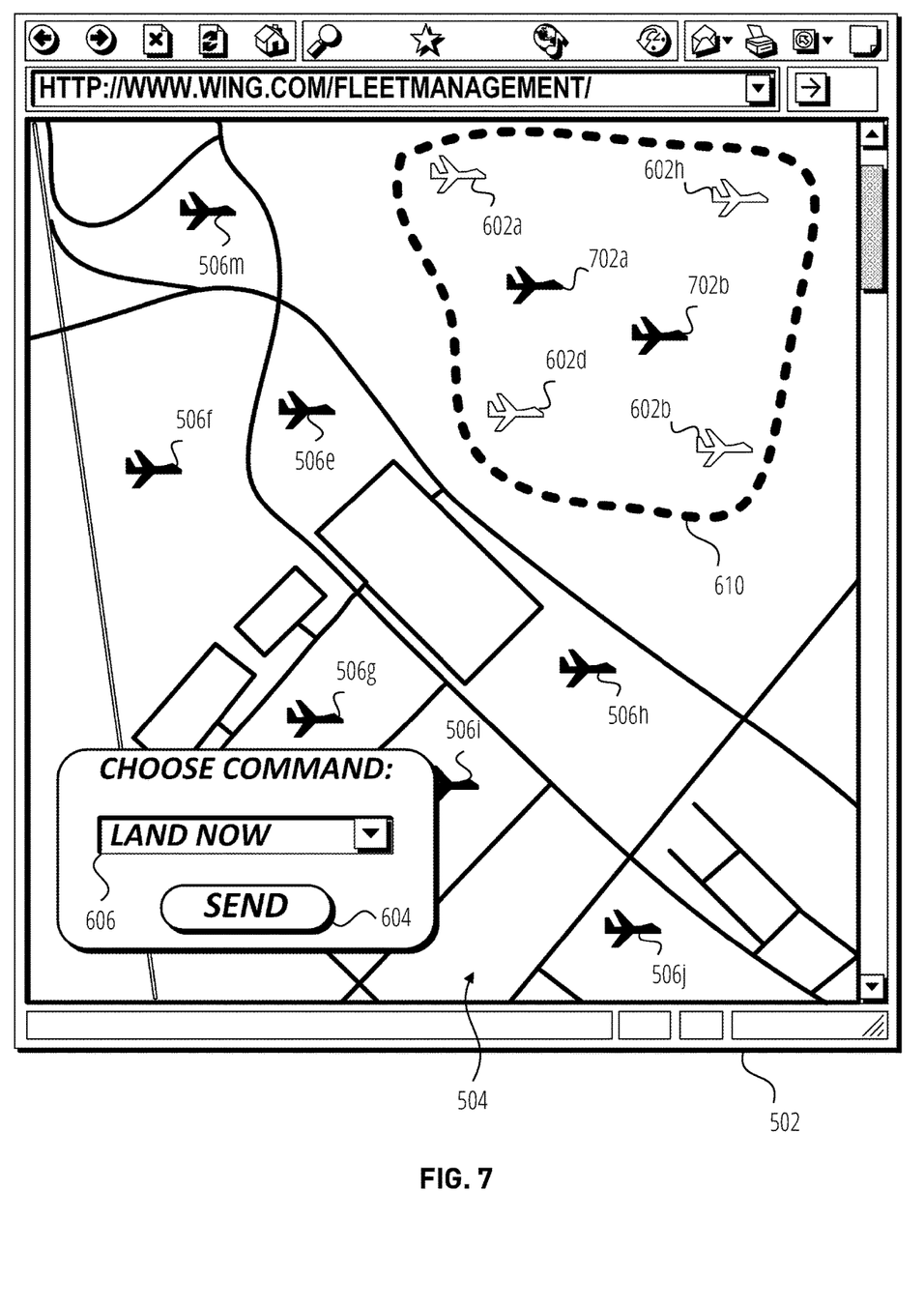
FIG. 7 is an illustration of a non-limiting example embodiment of a map interface after a de-selection of one or more UAV icons from the initial group of UAV icons according to various aspects of the present disclosure.

FIG. 7 is an illustration of a non-limiting example embodiment of a map interface after a de-selection of one or more UAV icons from the initial group of UAV icons according to various aspects of the present disclosure. In FIG. 7, the lasso selection border 610 from FIG. 6B is still shown, though in some embodiments, the selection border may disappear once the initial selection is made. As shown, selected UAV icon 602f and selected UAV icon 602g have been de-selected, and are now de-selected UAV icon 702b and de-selected UAV icon 702a, respectively. Since they have been de-selected, selected UAV icon 602a, selected UAV icon 602b, selected UAV icon 602d, and selected UAV icon 602h now make up the final selected group of UAV icons.

In some embodiments, the map interface 504 may accept multiple togglings of a given UAV icon between a selected state and a de-selected state, though only a single switch from selected to de-selected is illustrated in FIG. 7 for the sake of clarity. In some embodiments, the map interface 504 may also allow additional UAV icons that were not part of the initial group of UAV icons to be added to the final selected group of UAV icons (e.g., by modified clicking (e.g., a control-click or shift-click) on the additional UAV icons, by dragging the selection border around additional UAV icons, by adding an additional selection border, or by any other suitable technique.

Returning again to FIG. 4A, at optional block 410, the user interface engine 114 receives a tag to be associated with the final selected group of UAV icons and stores the tag and the final selected group of UAV icons in a command record data store 108 of the fleet management computing system 110. Though not illustrated, the tag may be provided via the map interface through one or more interface controls that allow the user to specify a tag to be applied. Saving a tag for the final selected group of UAV icons allows the user to address the same selected group of UAVs in the future, which may be particularly helpful when the UAVs have moved to different geographical regions but the user still desires to command them as a group.

At block 412, the user interface engine 114 receives an input identifying a command to be transmitted to UAVs associated with the UAV icons of the final selected group of UAV icons. Any suitable interface elements may be used to provide the input identifying the command to be transmitted. In FIG. 7, a simple choose command interface element 606 is provided as a drop-down list that allows the user to choose from multiple available commands that can be sent. Any appropriate command may be supported by the fleet management computing system 110 and listed in the choose command interface element 606, including but not limited to a "land now" command that causes UAVs to autonomously land at or near their current location; a "hover" command that causes UAVs to autonomously hover at their current position; a "return home" command that causes UAVs to autonomously return to a home base; and a "ceiling/floor" command that causes UAVs to autonomously navigate above a given floor altitude and/or below a given ceiling altitude.

Returning again to FIG. 4A, at block 414, a command transmission engine 116 of the fleet management computing system 110 transmits the command to the UAVs associated with the UAV icons of the final selected group of UAV icons. In some embodiments, the command is transmitted to the UAVs using a similar communication path as the path by which the telemetry information was received. In some embodiments, the command is transmitted in response to actuation of a user interface element, such as the send command interface element 604.

At block 416, the command transmission engine 116 stores a record of the command in the command record data store 108. In some embodiments, the record of the command indicates at least what command was sent and which UAVs it was sent to. In some embodiments, the record of the command may include a timestamp, a unique identifier, or other information that can allow the command transmission engine 116 to uniquely match the record of the command to subsequently received acknowledgement notifications.

The method 400 then proceeds to a continuation terminal ("terminal A").

From terminal A (FIG. 4B), the method 400 proceeds to block 418, where the command transmission engine 116 receives acknowledgement messages from one or more of the UAVs to which the command was transmitted. Though not illustrated in the method 400, once a UAV 200 receives a command, the command processing engine 316 transmits an acknowledgement message back to the command transmission engine 116 to indicate that the command was received before implementing the command. In some embodiments, the acknowledgement message may include a timestamp, a unique identifier, or other identifying information that allows the command transmission engine 116 to associate the acknowledgement message with the record of the command stored in the command record data store 108, as well as information that allows the command transmission engine 116 to identify the UAV 200 from which the acknowledgement message is sent.

At block 420, the command transmission engine 116 updates the record of the command in the command record data store 108 based on the acknowledgement messages. In this way, the record of the command in the command record data store 108 will keep track of which UAVs associated with icons in the final selected group of UAV icons have successfully received the command, and which have not.

At decision block 422, a determination is made regarding whether the fleet management computing system 110 should retry transmitting one or more failed commands. In some embodiments, the determination may be made based on whether the record of the command indicates any missing acknowledgement messages. In some embodiments, the determination may wait a predetermined amount of time after the initial transmission before determining that the command should be retried in order to allow for transmission latency and processing delay in the communication between the fleet management computing system 110 and the UAVs.

If it is determined that the fleet management computing system 110 should retry transmitting commands (e.g., if there are missing acknowledgement messages and the predetermined amount of time has passed), then the result of decision block 422 is YES, and the method 400 proceeds to block 424, where the user interface engine 114 presents one or more interface elements for retrying transmission of the command to one or more of the UAVs.

Figure 8:
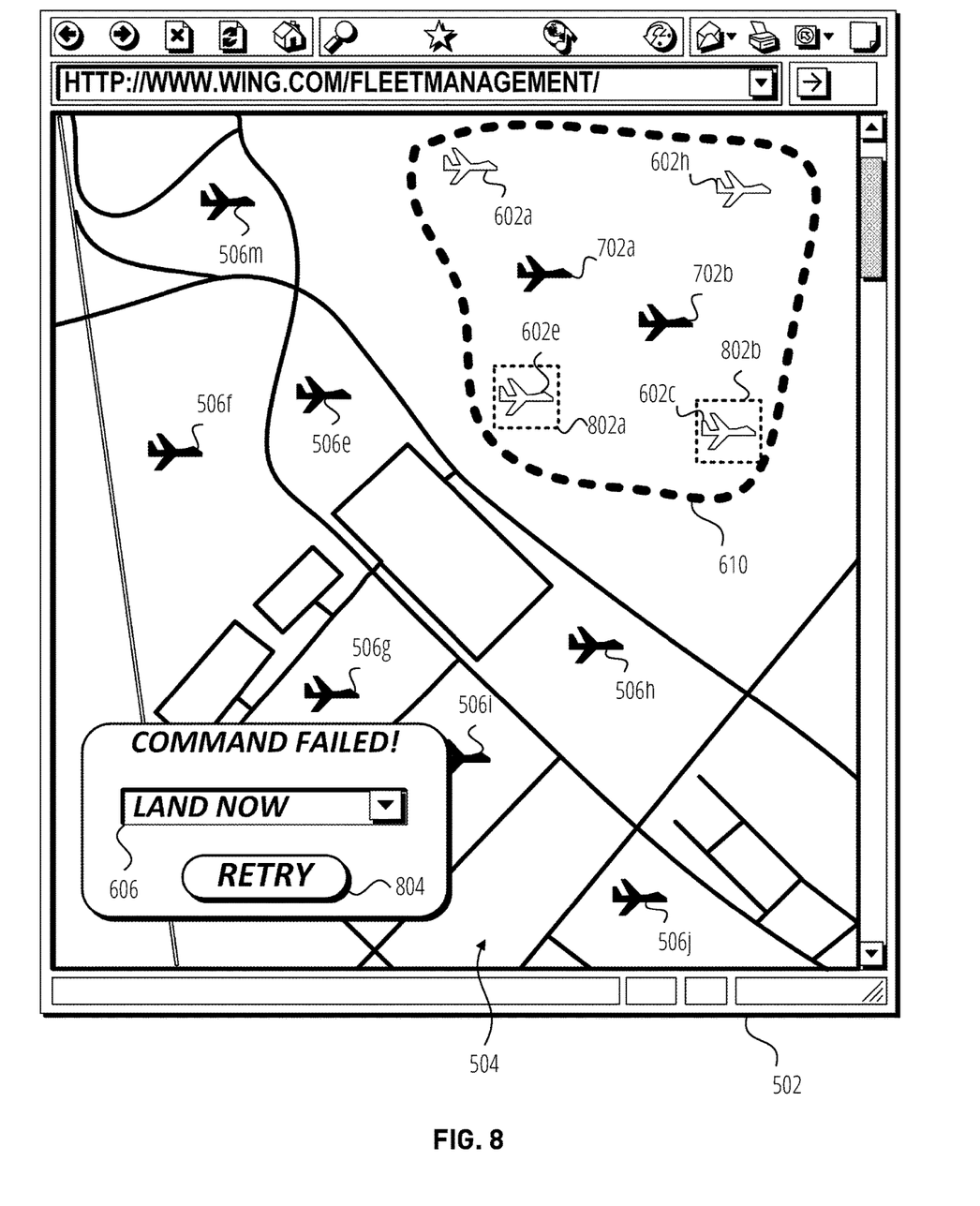
FIG. 8 is an illustration of a non-limiting example embodiment of a map interface presenting one or more interface elements for retrying transmission of the command to one or more of the UAVs according to various aspects of the present disclosure.

FIG. 8 is an illustration of a non-limiting example embodiment of a map interface presenting one or more interface elements for retrying transmission of the command to one or more of the UAVs according to various aspects of the present disclosure. In the map interface 504 of FIG. 8, a failed UAV icon 802a is shown to indicate that the transmission of the command associated with selected UAV icon 602e failed, and a failed UAV icon 802b is shown to indicate that the transmission of the command associated with selected UAV icon 602c failed. The user may actuate the retry command interface element 804 to send the command listed in the choose command interface element 606 to the UAVs associated with icons indicated by the failed UAV icons.

In some embodiments, the choose command interface element 606 may allow the user to change the command to be sent when retrying, while in other embodiments, the choose command interface element 606 may be made read-only when the retry command interface element 804 is presented. As with the other illustrations, the map interface 504 of FIG. 8 may allow the user to de-select one or more of the failed UAV icon 802a and the failed UAV icon 802b so that the command will not be retried to the associated UAVs. In some embodiments, the command transmission engine 116 may continue to check for acknowledgement messages, and may remove the failed UAV icons from any selected UAV icons for acknowledgement messages that come in after initially presenting the failed UAV icons so that the map interface 504 remains up to date.

Returning to FIG. 4B, after retrying transmission at block 424, the method 400 returns to block 418 to check for further command acknowledgements. Returning to decision block 422, if it was determined that no retry was desired, then the result of decision block 422 is NO, and the method 400 proceeds to an end block, where it terminates.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a fleet management computing system, causes the fleet management computing system to perform actions for managing a fleet of unmanned aerial vehicles (UAVs), the actions comprising:
receiving, by the fleet management computing system, telemetry information from a plurality of UAVs;

generating, by the fleet management computing system, a map interface having a plurality of UAV icons based on the telemetry information;

receiving, by the fleet management computing system, a selection of an initial group of UAV icons via the map interface, wherein the initial group of UAV icons includes two or more of the UAV icons;

receiving, by the fleet management computing system, a de-selection of one or more UAV icons from the initial group of UAV icons to create a final selected group of UAV icons;

transmitting, by the fleet management computing system, a command to UAVs associated with the UAV icons of the final selected group of UAV icons;

receiving, by the fleet management computing system, acknowledgement messages from UAVs that have received the command; and generating, by the fleet management computing system, an interface element to allow retrying transmission of the command to UAVs from which acknowledgement messages have not been received;

wherein generating the interface element to allow retrying transmission of the command includes de-selecting the UAV icons of the map interface associated with UAVs from which acknowledgement messages were received.

2. The computer-readable medium of claim 1, wherein receiving the selection of the initial group of UAV icons via the map interface includes receiving an input of a border around two or more UAV icons to be selected.

3. The non-transitory computer-readable medium of claim 2, wherein receiving the input of the border around the two or more UAV icons includes receiving a rectangular selection border.

4. The non-transitory computer-readable medium of claim 2, wherein receiving the input of the border around the two or more UAV icons includes receiving a lasso selection border.

5. The non-transitory computer-readable medium of claim 1, wherein receiving the de-selection of one or more UAV icons from the initial group of UAV icons includes receiving a click-and-modifier-key input, a right-click input, or a long-tap input.

6. The non-transitory computer-readable medium of claim 1, wherein transmitting the command to the UAVs associated with the UAV icons of the final selected group of UAV icons includes transmitting a land now command or a hover command.

7. The non-transitory computer-readable medium of claim 1, wherein the actions further comprise:
receiving, by the fleet management computing system, an indication of a tag to be applied to the UAVs associated with the UAV icons of the final selected group of UAV icons; and
storing, by the fleet management computing system, associations between the tag and the UAVs associated with the UAV icons of the final selected group of UAV icons.

8. A computer-implemented method of managing a fleet of unmanned aerial vehicles (UAVs), the method comprising:
receiving, by a fleet management computing system, telemetry information from a plurality of UAVs;
generating, by the fleet management computing system, a map interface having a plurality of UAV icons based on the telemetry information;

receiving, by the fleet management computing system, a selection of a group of UAV icons via the map interface, wherein the group of UAV icons includes two or more of the UAV icons;

transmitting, by the fleet management computing system, a command to UAVs associated with the UAV icons of the group of UAV icons;

receiving, by the fleet management computing system, acknowledgement messages from UAVs that have received the command; and generating, by the fleet management computing system, an interface element to allow retrying transmission of the command to UAVs from which acknowledgement messages have not been received;

wherein generating the interface element to allow retrying transmission of the command includes de-selecting the UAV icons of the map interface associated with the UAVs from which acknowledgement messages were received.

9. The computer-implemented method of claim 8, wherein receiving the selection of the group of UAV icons via the map interface includes receiving an input of a border around the two or more of the UAV icons.

10. The computer-implemented method of claim 9, wherein receiving the input of the border around the two or more of the UAV icons includes receiving a rectangular selection border.

11. The computer-implemented method of claim 9, wherein receiving the input of the border around the two or more of the UAV icons includes receiving a lasso selection border.

12. The computer-implemented method of claim 8, further comprising receiving a de-selection of one or more UAV icons from the group of UAV icons to create a final selected group of UAV icons, and
wherein receiving the de-selection of the one or more UAV icons from the group of UAV icons includes receiving a click-and-modifier-key input, a right-click input, or a long-tap input.

13. The computer-implemented method of claim 8, wherein transmitting the command to the UAVs associated with the UAV icons of the group of UAV icons includes transmitting a land now command or a hover command.

14. The computer-implemented method of claim 8, further comprising:
receiving, by the fleet management computing system, an indication of a tag to be applied to the UAVs associated with the UAV icons of the group of UAV icons; and
storing, by the fleet management computing system, associations between the tag and the UAVs associated with the UAV icons of the group of UAV icons.

15. A system, comprising:
a plurality of unmanned aerial vehicles (UAVs); and
a fleet management computing system communicatively coupled to the plurality of UAVs;
wherein the fleet management computing system includes a non-transitory computer-readable medium having logic stored thereon that, in response to execution by one or more processors of the fleet management computing system, causes the fleet management computing system to perform actions comprising:
receiving, by the fleet management computing system, telemetry information from the plurality of UAVs;
generating, by the fleet management computing system, a map interface having a plurality of UAV icons based on the telemetry information;

receiving, by the fleet management computing system, a selection of an initial group of UAV icons via the map interface, wherein the initial group of UAV icons includes two or more of the UAV icons;

receiving, by the fleet management computing system, a de-selection of one or more UAV icons from the initial group of UAV icons to create a final selected group of UAV icons;

transmitting, by the fleet management computing system, a command to UAVs associated with the UAV icons of the final selected group of UAV icons;

receiving, by the fleet management computing system, acknowledgement messages from UAVs that have received the command; and generating, by the fleet management computing system, an interface element to allow retrying transmission of the command to UAVs from which acknowledgement messages have not been received;

wherein generating the interface element to allow retrying transmission of the command includes de-selecting the UAV icons of the map interface associated with UAVs from which acknowledgement messages were received.

16. The system of claim 15, wherein receiving the selection of the initial group of UAV icons via the map interface includes receiving an input of a border around the two or more of the UAV icons;

wherein receiving the input of the border around the two or more of the UAV icons includes receiving a rectangular selection border or a lasso selection border; and wherein receiving the de-selection of one or more UAV icons from the initial group of UAV icons includes receiving a click-and-modifier-key input, a right-click input, or a long-tap input.

* * * * *